A. O. HEIL.
COMBINED BALANCE SHEET AND PAD HOLDER.
APPLICATION FILED APR. 23, 1908.
989,968.
Patented Apr. 18, 1911.
3 SHEETS—SHEET 1.
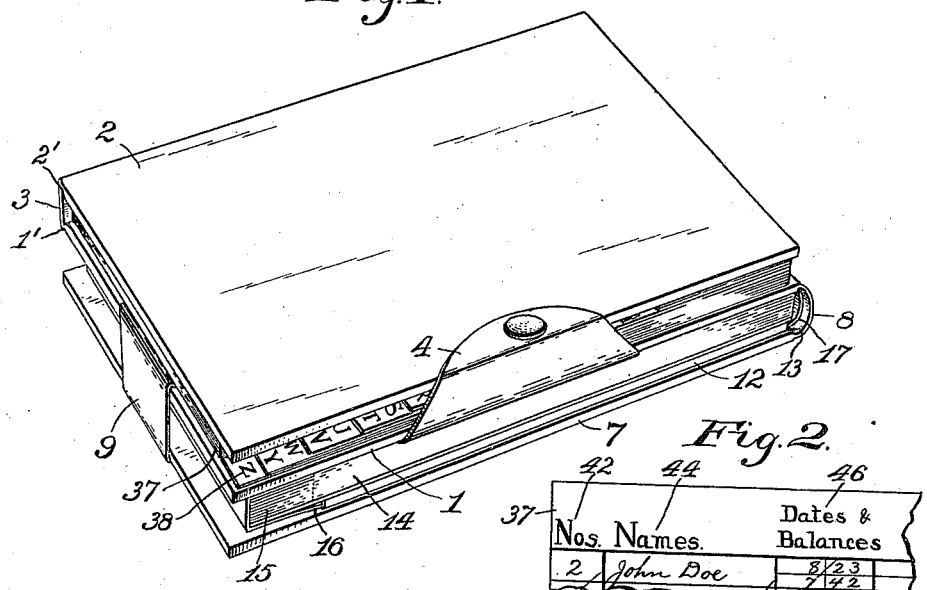
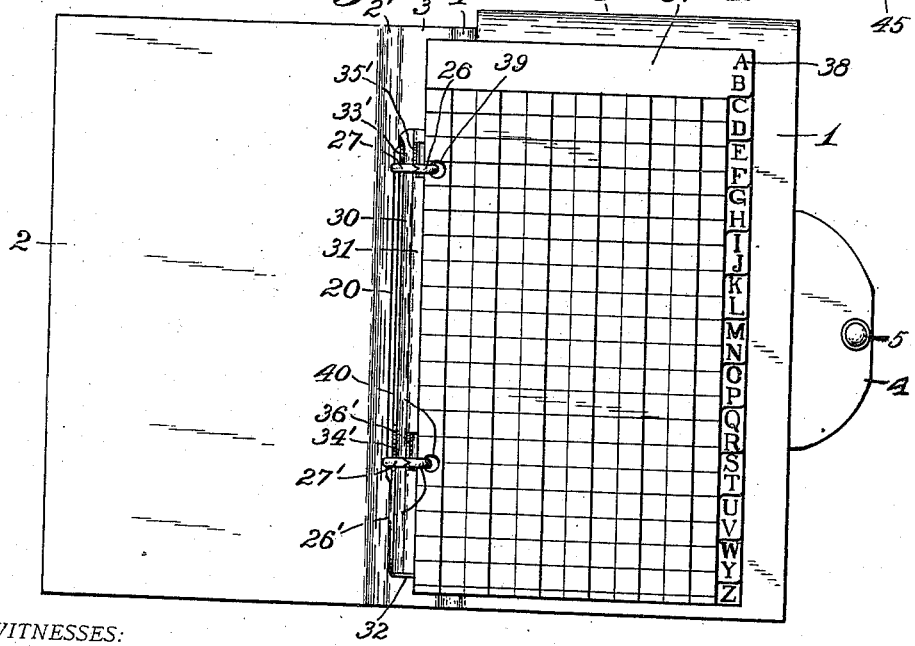
WITNESSES:
J. H. Gardner
M. D. Beaty
INVENTOR:
Alfred O. Heil,
BY
E. T. Silvius,
ATTORNEY.

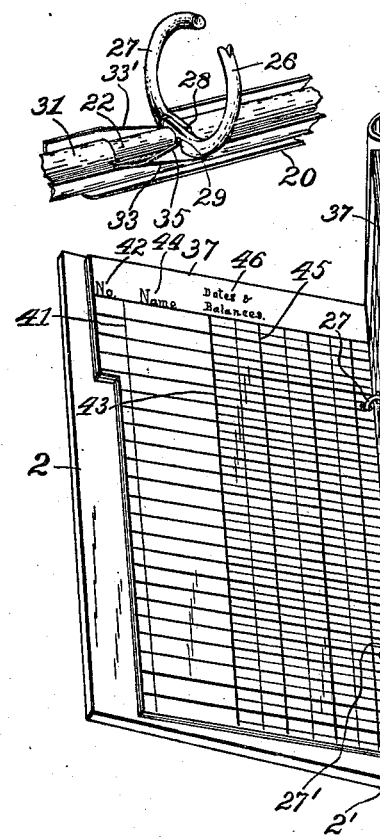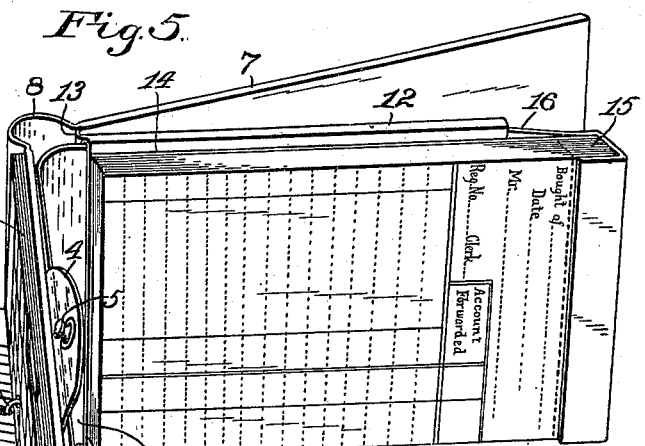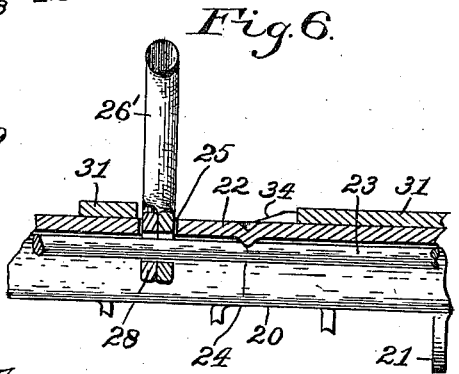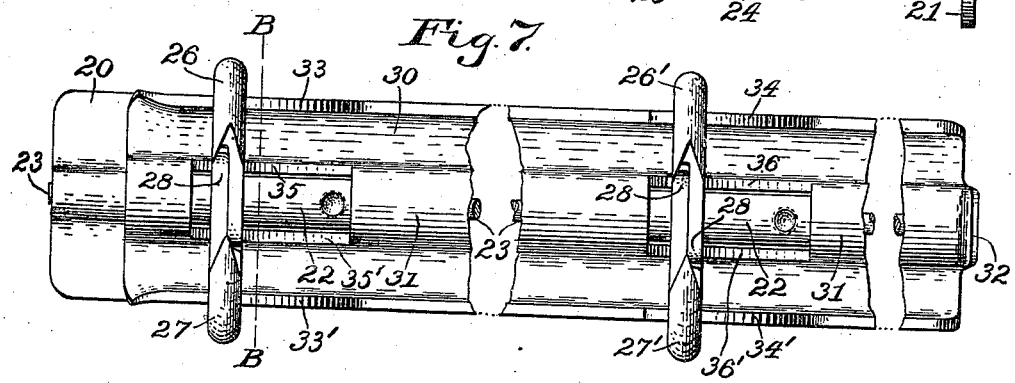

A. O. HEIL.
COMBINED BALANCE SHEET AND PAD HOLDER.
APPLICATION FILED APR. 23, 1908.
989,968.
Patented Apr. 18, 1911.
3 SHEETS—SHEET 3.
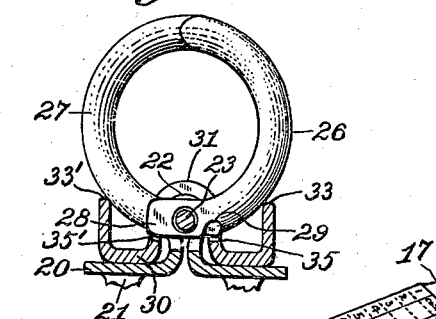
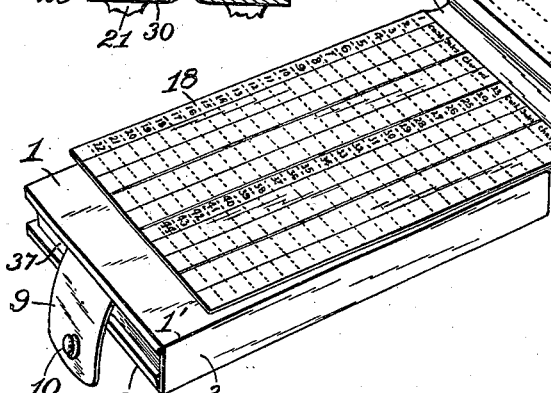
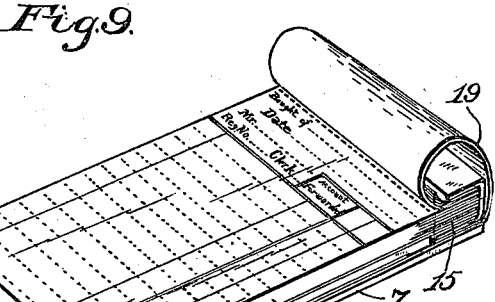
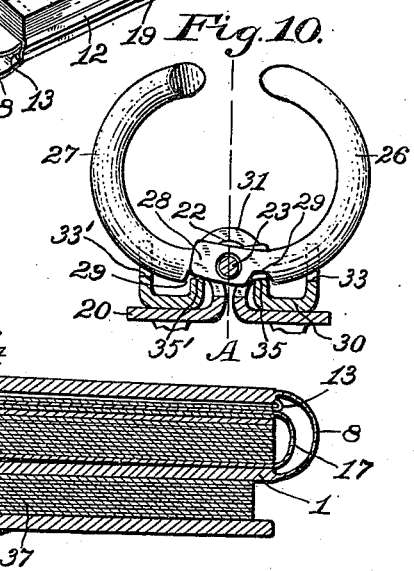
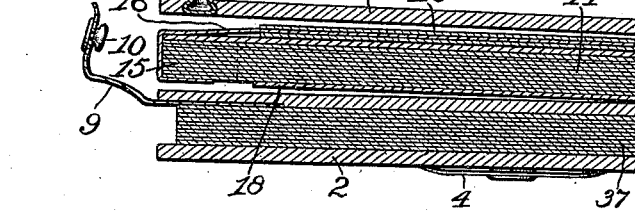
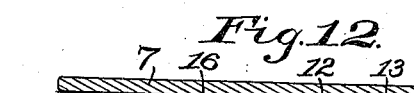
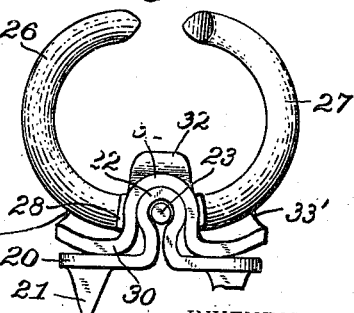
WITNESSES:
J. H. Gardner.
M. D. Beaty.
INVENTOR:
Alfred O. Heil,
BY
E. T. Silvius.
ATTORNEY.

UNITED STATES PATENT OFFICE.

ALFRED O. HEIL, OF TRENTON, NEW JERSEY, ASSIGNOR TO THE MCCASKEY REGISTER COMPANY, OF ALLIANCE, OHIO, A CORPORATION OF OHIO.

COMBINED BALANCE-SHEET AND PAD-HOLDER.

989,968.   Specification of Letters Patent.   Patented Apr. 18, 1911.

Application filed April 23, 1908. Serial No. 428,759.

*To all whom it may concern:*

Be it known that I, ALFRED O. HEIL, a citizen of the United States, residing at Trenton, in the county of Mercer and State of New Jersey, have invented certain new and useful Improvements in a Combined Balance-Sheet and Pad-Holder; and I do declare the following to be a full, clear, and exact description of the invention, reference being had to the accompanying drawings, and to the letters and figures of reference marked thereon, which form a part of this specification.

This invention relates to an article that is designed to be used in the conduct of business by merchants, especially retail dealers, as a means for taking orders systematically from customers at their houses, and for accurately keeping the accounts of the customers; the invention having reference particularly to an improved holder in which a pad of manifolding bill slips may be conveniently held, and containing an indexed book or balance sheets in which balances due the merchant may be entered by the clerk or solicitor at the place of business before beginning his trips to take the house to house orders on his route, the holder and balance sheets being adapted to be used also in the regular places of business, and either for credit accounts or for cash sales.

The objects of the invention are to provide improved means which will enable a merchant to send out solicitors, or drivers of the delivery wagons, fully equipped to inform customers as to the amounts which they may owe, so that payments may be made and accurately accounted for, and to enable the solicitor to enter the orders which he may receive for goods in presence of the customer, so as to avoid errors and for facilitating the billing transactions of the merchant, a further object being to provide improved appliances for the conduct of business that may be obtained at reasonable cost, and be convenient, durable and economical in use, other objects of minor importance being apparent from the following detail description of the invention.

The invention consists in a combined balance sheet and pad holder comprising a three part cover having a loose leaf binder attached thereto, and provided with a plurality of removable indexed balance sheets or leaves to receive customers' names and balances, the holder being provided with means whereby a pad of bill slips may be conveniently held and secured, or removed to be replaced by new pads; and the invention consists further in the novel parts and combinations and arrangements of parts of the article, as hereinafter particularly described and pointed out in the appended claims.

Referring to the drawings Figure 1 is a perspective view of a combined balance sheet and pad holder constructed substantially in accordance with the invention and folded up conveniently to be carried in the pocket of the soliciting clerk or merchant; Fig. 2, a fragmentary plan view illustrating the nature of the headings of the balance sheets; Fig. 3, a plan view of the holder partially opened so as to expose the balance sheets; Fig. 4, a fragmentary perspective view showing a portion of the loose leaf binder; Fig. 5, a perspective view of the complete article partially unfolded and showing the balance sheets and a pad of bill slips connected to the holder; Fig. 6, a fragmentary longitudinal sectional view through the loose leaf binder; Fig. 7, a fragmentary top plan of the loose leaf binder; Fig. 8, a transverse sectional view of the binder with the parts in position for holding the balance sheets; Fig. 9, a perspective view of the holder opened so as to permit of making entries on the bill slips, one of the bill slips being turned over under the pad so as to be out of the way and permit of writing on another slip, the record leaf of the pad being opened so that entries may be made thereon; Fig. 10, a transverse sectional view of the binder with parts shown in necessary position for releasing the balance sheets or leaves; Fig. 11, a longitudinal central sectional view of the complete article folded together; Fig. 12, a transverse central sectional view of the complete article folded; and, Fig. 13, an end elevation of the loose leaf binder.

Similar reference characters throughout the drawings designate corresponding elements or features of construction.

Practically embodied, the invention comprises a principal cover part 1 and a companion cover part 2 for the balance sheets, the two cover parts being composed of any suitable material similar to that employed in making book covers and are connected together by a stiff back 3 which is connected to the two parts directly by flexible hinge like parts 1' and 2'. The cover part 1 is provided at its free edge with a flap 4 provided with a clasp stud 5 adapted to enter a socket 6 with which the cover part 2 is provided, so as to clasp the covers together to protect the balance sheets against being soiled when the holder is carried in the streets. The holder comprises also a cover 7 that is connected to the cover part 1 by a flexible back 8 which is approximately equal in length to the shorter dimension of either the part 1 or the part 7, each cover part being rectangular and oblong in plan, the back 3 being approximately equal to the longer dimension of either cover part 1 or 2, so that the cover parts 2 and 7 open in different directions with respect to the cover part 1 and to each other, as will appear clearly in Fig. 5. The narrower end of the cover part 1 is provided with a flap 9 having a clasped stud 10 adapted to engage the interior of a socket 11 with which the cover part 7 is provided, so as to clasp the two parts of the cover together when not in use. The cover is provided with a case 12 that is connected at one of its open ends by a flexible hinge like part 13 to the cover part 7 where it is connected to the back 8, the case being adapted to receive the record leaf or backboard with which the pads are usually provided, for holding the pad removably in the cover.

In the drawings a familiar type of manifolding pad 14 is shown in which all of the bill slips are bound together at one end by means of stubs 15 so that all of the slips may be torn out after entries are made or when convenient, and alternate slips may have transferring material on their backs or a separate carbon sheet may be employed for manifolding, as will be understood, the pad being provided in the present case with a record leaf 16 that is bound to the head of the pad and extends under the bill slips, being sufficiently long so that a part thereof forms a folding portion 17 and a record blank 18 adapted to fold over upon the pad so that totals of invoices or bills may be entered conveniently on the record leaf when desired. The record leaf may be inserted into and drawn through the case 12 and extend onto the cover part 1 as in Figs. 5 and 9, and as will be seen in Fig. 9, a bill slip 19 is turned over the head of the pad and extends between the case 12 and the cover part 7, so that the next bill slip may be written upon, which will be convenient on the route when it is desired to retain the bill slips until return to the place of business, so that additional entries may be made and duplicated if required.

The pad, as will be readily understood, may be removed from the holder by withdrawing the record leaf 16 from the case 12, and as will be clear in case the pad is not provided with a record leaf, the pad may be held by the cover by inserting the backboard of the pad in the case 12. The bill slips forming the pad may be printed in various designs as will be understood to suit requirements, it being customary in credit account systems to bring forward balances due onto new bills from the preceding bills, so that the last bill rendered will show the total amount due from the customer to the merchant, which amount may be readily ascertained without the necessity of referring to book entries, the duplicate bill slips being retained by the merchant in systematic order in suitable registers or cabinets suitably designed for the purpose. In order that the route agent may on his trips be possessed of the same information as contained in the duplicate bills with reference to the total amounts due from customers on his route, the book of balance sheets is provided and arranged so as to be conveniently at hand in connection with the pad of bill slips.

The loose leaf binder comprises a base plate 20 which is suitably secured as by means of prongs 21 to the back 3, the base being composed of a metallic plate doubled up along its middle portion so as to form a rounded guide 22 which holds a pivot rod 23 in its embrace, the rod being secured against endwise movement by an indented portion 24 pressed into a suitable recess in the rod, the top of the guide 22 having suitable openings 25 therein to receive portions of the rings on which the balance sheets are bound, there being two rings, one comprising two parts 26 and 27 coöperating one with the other to form a ring, and the other one comprising two parts 26' and 27' coöperating to form a ring, each ring part being pivoted to the rod and having a shank portion 28 for its control, and a recess 29 to clear controlling elements that operate in connection with the companion ring part. A controller for opening or closing the rings comprises a plate 30 which is mounted slidingly on the base plate 20, being doubled up along its middle portion over the guide 22 so as to form a guide portion 31 which is semicircular in cross section and has portions cut away to clear the parts of the rings, and one end of the guide portion 31 is provided with an upturned finger piece 32 for manipulating the controller, the latter having upturned flanges on which are formed inclined bars 33 and 33' adapted to engage the under sides of the ring parts 26 and 27 for closing them, and similar inclined bars 34 and 34' adapted to engage the under sides of the ring parts 26' and 27' whereby to close them and hold them in closed positions. At opposite sides of the cut away portions are reversely inclined bars 35 and 35', and 36 and 36' for engaging the ends of the shanks 28 for opening the rings when the controller is moved in the opposite direction.

The balance sheets 37 are preferably formed of cardboard and have suitable index letters as 38 at one of the longer sides thereof, and a pair of holes 39 and 40 in the opposite side thereof to receive the binder rings. One side of each sheet has a vertical line 41 dividing off a column designated as at 42 by "Nos." indicating that the register numbers of the customers are to be entered in the column. Another vertical line 43 is arranged so as to provide another vertical column designated at the top thereof as at 44 by "Names" indicating that the names of the customers are to be written in the column, and a suitable number of other vertical lines as 45 are printed at suitable distances from the line 43 so as to provide columns in which to enter the balances due opposite the names and the dates, these columns being headed as at 46 by the words "Dates and balances" or similar designations, illustrated particularly in Fig. 2. Suitable horizontal lines are printed also on the sheets on which to write the desired data. The opposite side of each sheet is arranged in a similar manner for designating columns in which to enter the dates and balances. Any suitable number of sheets may be employed and they may be printed in any suitable manner as may be desired.

In practical use, the person who starts out on the route to take orders for groceries or other merchandise will first refer to the duplicate bills on file in the credit registers and ascertain the register numbers, the names and the amounts of balances owing by the customers and enter them together with the current date on the balance sheets with respect to the indexing thereon, an example of the entries being seen in Fig. 2 where on the eighth month and twenty-third day John Doe, whose registry number is No. 2 owes seven dollars and forty-two cents. If a customer desires to pay something on account the proper credit may be given on one of the bill slips and the remaining amount still due should be entered thereon together with the amounts of orders for new goods which may at that time be given. In making each entry a duplicate of the order will be made as usual and the bills can be completed after returning to the store and ascertaining the prices if necessary, and when the goods are delivered one of the complete bills showing the balance due will accompany the goods, the other one to be retained by the merchant to complete his records. In the case of cash payments at the residences, of course a separate bill slip showing that transaction may be given to the customer as a receipt and the order entered on another slip and duplicate. A supply of pads of the bill slips may be carried conveniently and made use of after having used and exhausted the slips of the pad in the holder, and after having filled the balance sheets, so that no more space remains for use, the rings of the binder may be opened and the balance sheets readily removed, after which new balance sheets may be inserted in the loose leaf binder.

Having thus described the invention, what is claimed as new is—

1. A combined balance sheet and pad holder including a pair of cover parts, a back connected flexibly to the cover parts and having a loose-leaf binder mounted thereon, and a cover part for holding a pad and connected flexibly to one of the pair of cover parts.

2. A combined balance sheet and pad holder including a pair of cover parts, a back connected flexibly to the cover parts, a loose leaf binder mounted on the back, and a cover part having a case mounted thereon and connected to one of the pair of cover parts, the case having an opening to receive a leaf of a pad.

3. A combined balance sheet and pad holder including a pair of cover parts, a back connected to the cover parts and having a plurality of balance sheets mounted removably thereon, each balance sheet having thereon a column designated to receive names and having also a plurality of columns designated to receive dates and balances opposite to the names, and a cover part for holding a pad and connected to one of the pair of cover parts.

4. A combined balance sheet and pad holder including a pair of cover parts, a back connected flexibly to sides of the cover parts, a loose leaf binder mounted on the back, and a cover part connected flexibly to one of the pair of cover parts at a side thereof different to the side at which it is connected to the back, one of the cover parts having a case connected flexibly thereto for holding a pad.

5. A combined balance sheet and pad holder including a pair of cover parts, a back connected flexibly to sides of the cover parts, a loose leaf binder mounted on the back, a clasp for the pair of cover parts, a cover part connected flexibly to one of the pair of cover parts and having a case connected flexibly thereto and having also a clasp for connection with said one of the pair of cover parts, a plurality of balance sheets connected to the binder, and a pad of bill slips connected to the case.

6. In a combined balance sheet and pad holder, the combination of a pair of cover parts, a back connected to the cover parts, a cover part connected to one of the pair of cover parts and provided with a case for holding a pad, a binder base secured to the back, a pair of rings each comprising two coöperating parts having shanks pivoted on the base, and a controller mounted slidingly on the base and having inclined bars to engage the ring parts for closing the rings and also oppositely inclined bars to engage the shanks of the ring parts for opening the rings.

7. The combination with a pair of covers hinged together, of means for hingedly supporting a series of leaves between the said covers, a separate cover hingedly connected to one of the said covers, a pad, and means carried by the said separate cover for supporting the pad thereon.

8. The combination with a pair of covers hinged together, of means for hingedly supporting a series of leaves between the said covers, a separate cover hingedly connected to one of said covers along one of its free edges, a pad, and means carried by the said separate cover for supporting the pad thereon.

9. The combination of a back having a hinged cover, means for detachably and hingedly supporting a series of leaves between the cover and back, and a pad or set of leaves swingably supported by the said back and movable in a plane at right angles to the plane in which the said series of leaves move.

10. The combination of a back having a hinged cover, means, comprising binder rings, for detachably and hingedly supporting a series of leaves between the cover and back, and a pad or set of leaves swingably supported by the said back and movable in a plane at right angles to the plane in which the series of leaves move.

11. The combination of a base plate folded along its middle portion, the folded portion being slotted, a pair of similar ring parts inserted in the slots and having pivot-holes therein, a pivot-rod embraced in said folded portion of the base and extending through the pivot-holes, and a controller comprising a plate movable on the base plate and extending over the folded portion thereof, the controller plate having upturned edges constituting inclined bars engaging the ring parts at opposite sides of the pivot-rod.

12. The combination of a back, two cover parts flexibly connected to the back, means for holding loose leaves removably on the back, and means for holding a pad of leaves swingingly and removably on a free edge of one of the two cover parts.

In testimony whereof, I affix my signature in presence of two witnesses, on the 12th day of November 1907.

ALFRED O. HEIL.

Witnesses:
JOHN J. KENTS,
ANNA K. PETTIT.

---

Copies of this patent may be obtained for five cents each, by addressing the "Commissioner of Patents, Washington, D. C."